United States Patent [19]

Miyazawa et al.

[11] 4,381,439
[45] Apr. 26, 1983

[54] SELF-CONTROLLED MICROWAVE OVEN

[75] Inventors: Susumu Miyazawa, Chigasaki; Norisuke Fukuda, Tokyo, both of Japan

[73] Assignee: Tokyo Shibaura Denki Kabushiki Kaisha, Kawasaki, Japan

[21] Appl. No.: 214,978

[22] Filed: Dec. 10, 1980

[30] Foreign Application Priority Data

Dec. 21, 1979 [JP] Japan .................... 54-166419

[51] Int. Cl.³ .................... H05B 6/68; G01K 5/42
[52] U.S. Cl. .................. 219/10.55 B; 219/10.55 E; 219/10.55 R; 340/592; 99/421 TP; 374/117; 374/155
[58] Field of Search ............... 219/10.55 E, 10.55 M, 219/10.55 B, 10.55 R; 99/421 TP; 73/352, 368.3, 368.4, 368.7; 340/592, 593

[56] References Cited

U.S. PATENT DOCUMENTS

| 3,435,682 | 4/1969 | Linke et al. | 73/368.3 |
| 4,081,645 | 3/1978 | Javes et al. | 219/10.55 E |
| 4,083,250 | 4/1978 | Goff et al. | 73/352 |
| 4,088,863 | 5/1978 | Jellies | 219/10.55 E |
| 4,197,741 | 4/1980 | Morrow, Jr. | 73/362 AR |
| 4,230,731 | 10/1980 | Tyler | 73/352 |

FOREIGN PATENT DOCUMENTS

| 53-45549 | 4/1978 | Japan . |
| 55-28918 | 2/1980 | Japan . |
| 55-86637 | 6/1980 | Japan . |

Primary Examiner—B. A. Reynolds
Assistant Examiner—Philip H. Leung
Attorney, Agent, or Firm—Oblon, Fisher, Spivak, McClelland & Maier

[57] ABSTRACT

A microwave oven is provided according to which food is cooked while a temperature sensor is inserted in the food and the heating of the food is interrupted in response to an output signal of the temperature sensor. The temperature sensor comprises a hollow skewer, a bellows which is attached to the skewer and in which is sealed a liquid of high coefficient of thermal expansion, and a sound generating body of a plate spring for generating a sound when the hollow skewer is heated by the food, the liquid is expanded, the bellows is stretched, and the force generated thereby overcomes the biasing force. The microwave oven stops heating and cooking when a sound is generated.

3 Claims, 20 Drawing Figures

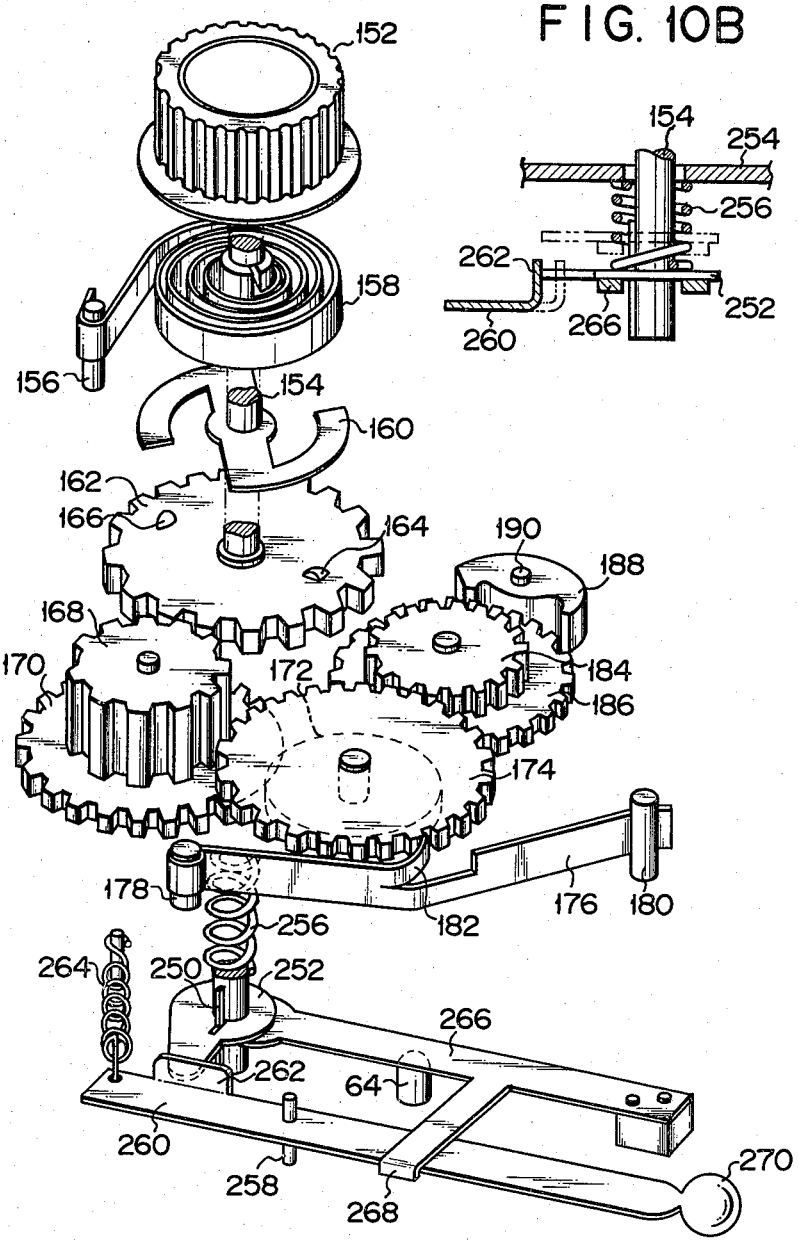

SELF-CONTROLLED MICROWAVE OVEN

The present invention relates to a microwave oven and, more particularly, to a microwave oven which automatically interrupts the heating of food to be cooked.

In a microwave oven, it is general practice to control the heating of food to be cooked by detecting the temperature of the food. Methods for such detection include a method of blowing a whistle utilizing water vapor evaporated from the food, or a method according to which a heat-sensitive rod which changes color according to the temperature is inserted in the food. However, the former method is unsuitable since the food must be heated under a sealed condition. With the latter method, the cook must constantly check the food, resulting in inconvenience and erroneous detection. An infrared ray sensor has been recently developed, and it has been proposed to attach it to the surface of the food. However, with this method, only the temperature at the surface of the food can be measured, and the lead wire of the sensor may disadvantageously be twisted and cut during rotation of the food.

It is, therefore, the primary object of the present invention to provide a microwave oven which is simple in construction, and which detects the temperature of the food with certainty for controlling heating of the food.

The above and other objects of the present invention are accomplished by a microwave oven comprising: high frequency oscillating means for producing microwaves for heating of food; a sound generating member which is inserted in the food, which contains a liquid sealed within, and which generates a sound by the thermal expansion of the liquid; and a control circuit which detects the sound generated by the sound generating member, supplies an oscillation control signal to the high frequency oscillating means, and controls the heating of the food.

This invention can be more fully understood from the following detailed description when taken in conjunction with the accompanying drawings, in which:

FIGS. 10A and 10B are a perspective view and a plan view, respectively, of the sound generating mechanism inside the heat-sensitive probe of a third embodiment;

Figure 1:
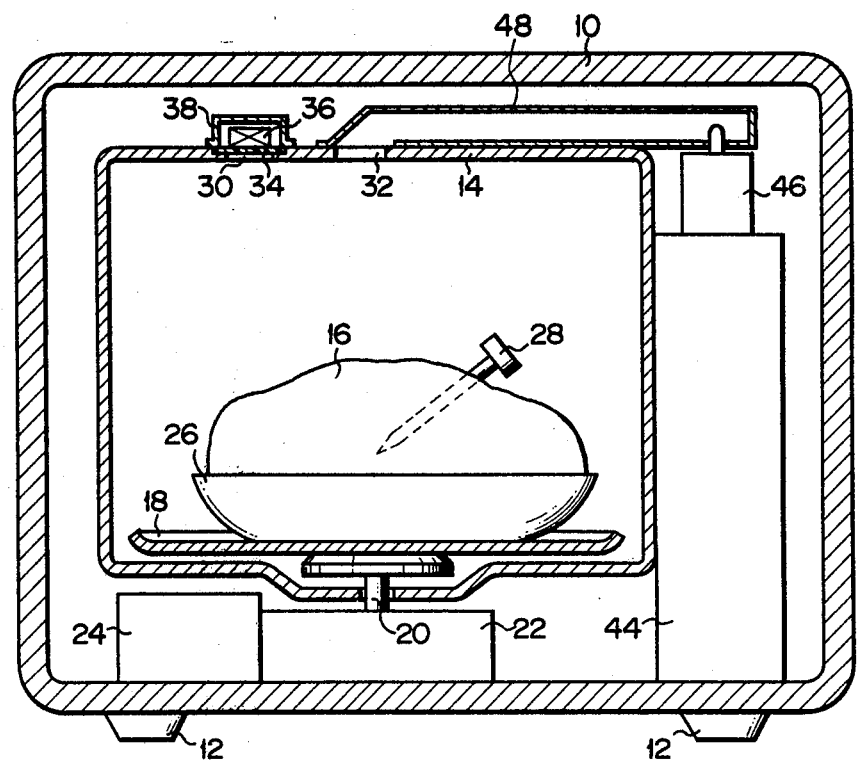
FIG. 1 is a schematic view illustrating the construction of a first embodiment of a microwave oven according to the present invention.

The first embodiment of a microwave oven according to the present invention will be described referring to the accompanying drawings. FIG. 1 is a schematic sectional view illustrating the construction of this embodiment. Legs 12 are disposed at the bottom of a housing 10. Inside this housing 10 is disposed a heating chamber 14, the inside of which is processed for shielding against microwaves. The processing for shielding against microwaves is such that microwaves inside the heating chamber 14 do not permeate to the outside but are totally reflected to the inside of the heating chamber 14, and no microwaves from the outside can enter the heating chamber 14. Although not shown in the figure, a door which is free to open and close is disposed at the front wall of the heating chamber 14, and food 16 to be cooked is placed inside the heating chamber 14 through this door. A table 18 is disposed at the lower part of the heating chamber 14, and the lower surface of the table 18 is connected to the upper end of a rotary shaft 20. An opening through which the rotary shaft 20 extends is formed in the lower surface of the heating chamber 14. The lower end of the rotary shaft 20 is connected to a motor 24 through a gear mechanism 22. The food 16 is placed on a tray 26 which is then placed on the table 18. A heat-sensitive probe 28 is inserted in the food 16.

Figure 2:
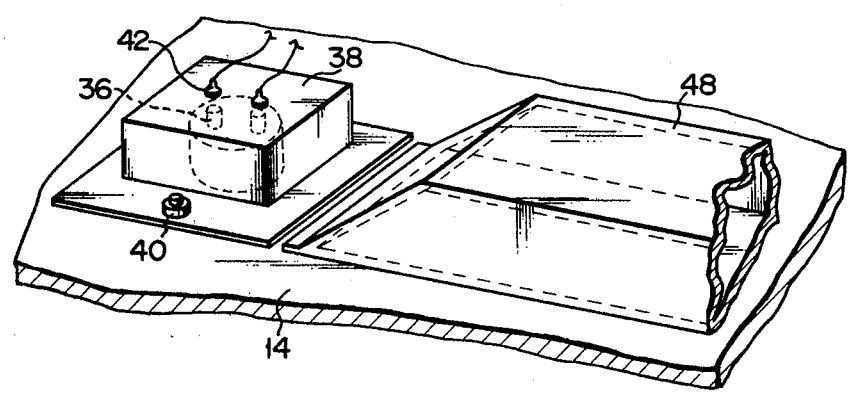
FIG. 2 is a partial perspective view of FIG. 1.

Two openings 30 and 32 are formed in the upper surface of the heating chamber 14, and a microphone 36 is disposed at the opening 30 through a moisture-proof plate 34. The opening 32 is formed at the center of the upper surface. The microphone 36 is of microelectric condenser type and is protected from vibrations with a damper or the like. As shown by the perspective view of FIG. 2, the microphone 36 is disposed inside a casing 38 which is processed to shield against microwaves. The casing 38 is securely fixed to the upper wall of the heating chamber 14 by a screw 40. An output terminal 42 of the microphone 36 is connected to a magnetron control circuit 44 shown in FIG. 2. The magnetron control circuit 44 is connected to a magnetron 46. The output part of the magnetron 46 is inserted in one end of a waveguide 48. This one end of the waveguide 48 is closed and the other end thereof is tapered and is connected to the opening 32 of the upper surface of the heating chamber 14. A starafan is disposed in the vicinity of the opening 32, although it is not shown in the figure.

Figure 3A:
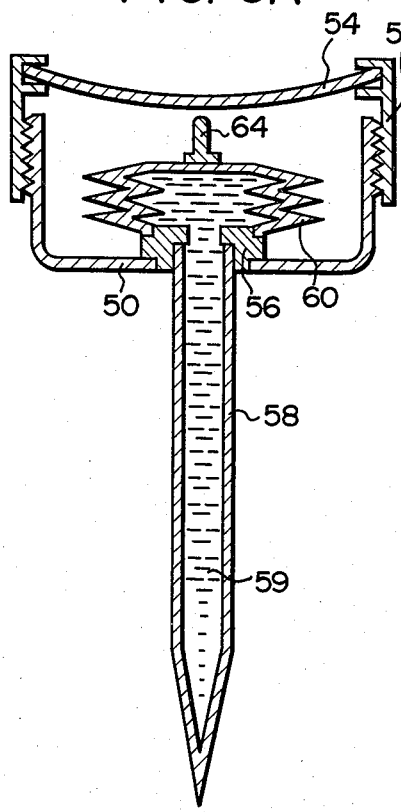
FIGS. 3A and 3B are sectional views of the heat-sensitive probe.
Figure 3B:
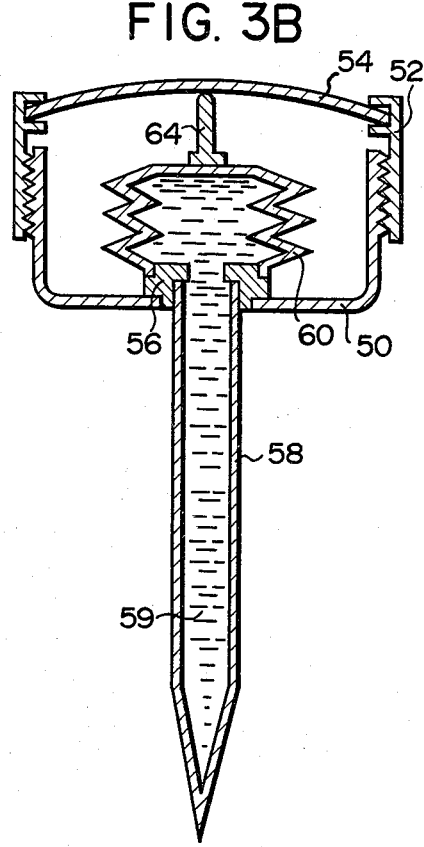

FIGS. 3A and 3B are sectional views of the heat-sensitive probe 28. FIG. 3A shows the form at room temperature, and FIG. 3B shows the form under heating. A lid body 52 is screwed to the outer circumference of a bowl-shaped container 50. A plate spring 54 which is bent downwardly is fitted into the upper part of the lid body 52. An opening is formed at the center of the lower surface of the bowl-shaped container 50. One end of a metal skewer 58 is connected through a packing 56 to the opening. The skewer 58 is of hollow construction. The end of the skewer 58 which is connected to the packing 56 is open, and the other end thereof is pointed to be inserted into food. A bellows 60 communicating with the open end of the skewer 58 through the packing 56 is disposed inside the bowl-shaped container 50. A liquid 59 with a high coefficient of thermal expansion is sealed inside the bellows 60 and the skewer 58. This liquid must be practically noncorrosive to metals and it must be nontoxic in case the liquid leaks to the outside. A pin 64 protrudes from the top of the bellows 60. When the liquid 59 is expanded by heating, the bellows 60 is stretched so as to press up the plate spring 54 with the pin 64 as shown in FIG. 3B.

Figure 4:
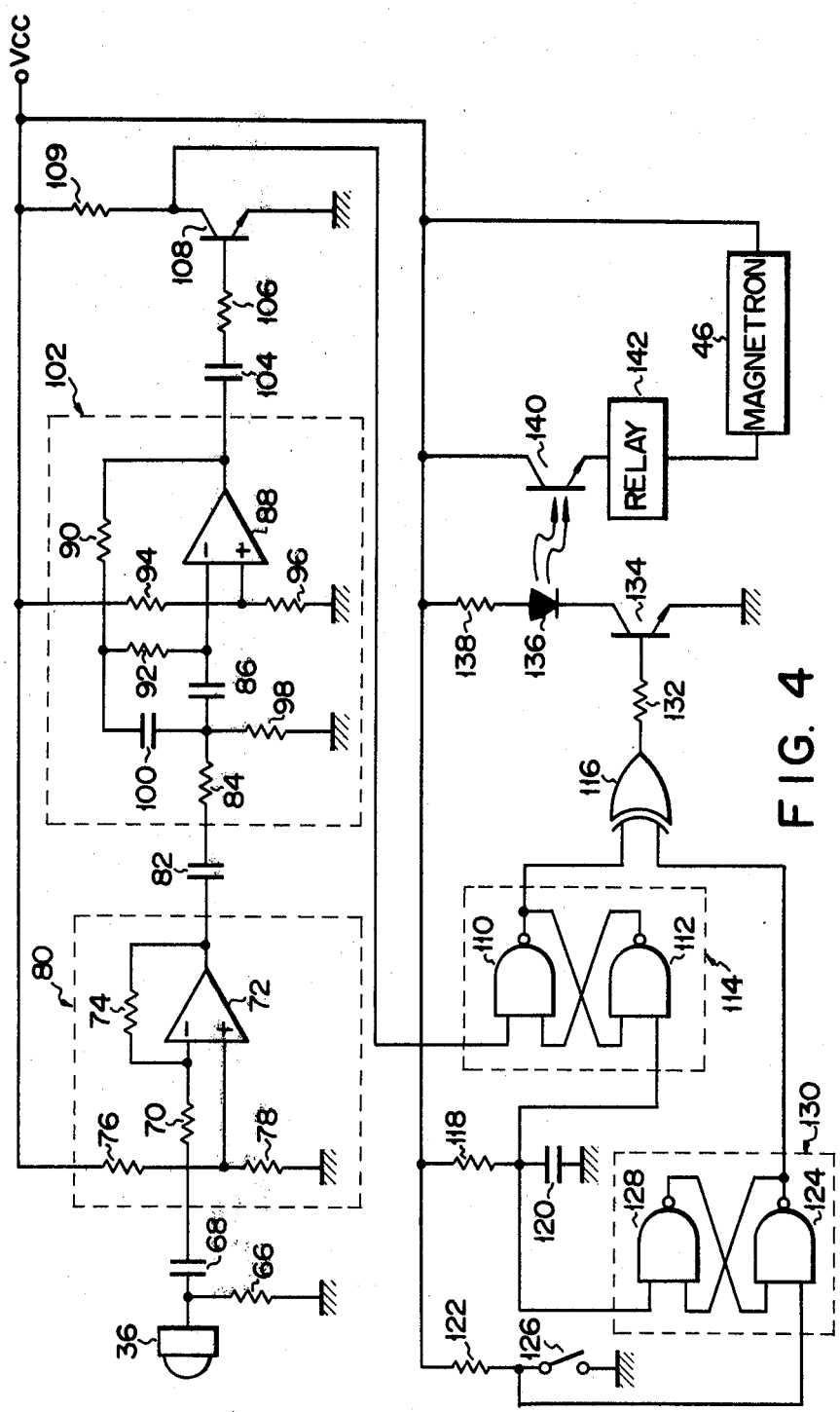
FIG. 4 is a circuit diagram of the control circuit of the first embodiment.

FIG. 4 shows a circuit diagram of the magnetron control circuit 44. An output terminal of the microphone 36 is grounded through a bias resistor 66 as well as being connected to the inverting input terminal of an operational amplifier 72 through a coupling capacitor 68 and an input resistor 70 connected in series. The output terminal of the operational amplifier 72 is connected to the inverting input terminal through a feedback resistor 74. A junction point of bias resistors 76 and 78 is connected to the non-inverting input terminal of the operational amplifier 72. The other terminal of the bias resistor 76 is connected to a power source terminal Vcc, while the other terminal of the bias resistor 78 is grounded. The operational amplifier 72 and the resistors 70, 74, 76 and 78 comprise an inverting amplifying circuit 80. The amplification of the amplifying circuit 80 is well known to be R74/R70, where R74 and R70 are the resistances of the feedback resistor 74 and input resistor 70.

The output terminal of the operational amplifier 72 is connected to one terminal of a capacitor 86 through a coupling capacitor 82 and an input resistor 84 connected in series. The other terminal of the capacitor 86 is connected to the inverting input terminal of an operational amplifier 88. The output terminal of the operational amplifier 88 is connected to the inverting input terminal through a feedback resistor 90 and a bias resistor 92 connected in series. A junction point of bias resistors 94 and 96 is connected to the noninverting input terminal of the operational amplifier 88. The other end of the bias resistor 94 is connected to the power source terminal Vcc, and the other end of the bias resistor 96 is grounded. A junction between the input resistor 84 and the capacitor 86 is grounded through a resistor 98, as well as being connected to a junction between the resistors 90 and 92 through a capacitor 100. The operational amplifier 88, the resistors 84, 90, 92, 94, 96 and 98, and the capacitors 86 and 100 comprise a band-pass filter 102.

The output terminal of the operational amplifier 88 is connected to the base of an npn transistor 108 through a coupling capacitor 104 and a base resistor 106 connected in series. The emitter of the transistor 108 is grounded, and its collector is connected the power source terminal Vcc through a resistor 109 and to a first input terminal of a NAND gate 110. The NAND gate 110 together with a NAND gate 112 comprises an $\overline{RS}$ flip-flop 114 in which the first input terminal of the NAND gate 110 is the set terminal $\overline{S}$ and its output terminal is the output terminal Q. The output terminal of the NAND gate 110 is connected to one input terminal of an exclusive-OR (hereinafter simply says EX-OR) gate 116. A resistor 118 is connected at one end to the power source Vcc and at the other end to the first input terminal of the NAND gate 112, i.e., the reset terminal $\overline{R}$. The resistor 118 is also ground at this other end through a capacitor 120. The resistor 118 and the capacitor 120 comprise a pull-up circuit of the power source. A resistor 122 is connected at one end to the power source terminal Vcc and at the other end to the first input terminal of a NAND gate 124. This other end is also grounded through a switch 126. The switch 126 is a normally open switch which is closed in cooperation with an operation button (not shown). The resistor 122 and the switch 126 comprise a reset circuit. An $\overline{R}\,\overline{S}$ flip-flop 130 comprises the NAND gate 124 and a NAND gate 128; the first input terminal of the NAND gate 124 is the set terminal $\overline{S}$, and its output terminal is the output terminal Q. A junction between the resistor 118 and the capacitor 120 is connected to the first input terminal of the NAND gate 128, i.e., the reset terminal $\overline{R}$ of the $\overline{R}\,\overline{S}$ flip-flop 130. The output terminal of the NAND gate 124 is connected to the other input terminal of the EX-OR 116.

The output terminal of the EX-OR gate 116 is connected to the base of an npn transistor 134 through a resistor 132. The emitter of the transistor 134 is grounded, and its collector is connected to the cathode of a light-emitting diode 136. The anode of the light-emitting diode 136 is connected to the power source terminal Vcc through a resistor 138. The emitter of a phototransistor 140 disposed so as to receive the light emitted from the light-emitting diode 136 is connected to one terminal of the magnetron 46 through a relay 142. The collector of the phototransistor 140 is connected to the power source terminal Vcc. The other terminal of the magnetron 46 is connected to the power source terminal Vcc.

The mode of operation of the first embodiment will now be described. As shown in FIG. 1, the heat-sensitive probe 28 is inserted into the food 16, the food 16 is placed on the tray 26, and the tray 26 is placed on the table 18 inside the heating chamber 14. At this time, as shown in FIG. 3A, the heat-sensitive probe 28 is under the condition that the bellows 60 is shrunk and the plate spring 54 is bent downwardly, for example, by a cook.

When the main power source of the apparatus is turned on, the potential at the junction between the resistor 118 and the capacitor 120 of the pull-up circuit shown in FIG. 4 immediately becomes L level. Under this condition, the output terminals of the NAND gates 112 and 128 are at H level, and the output terminals of the NAND gates 110 and 124 are at L level. When the capacitor 120 is charged, the first input terminals of the NAND gates 112 and 128 are at H level. Since the other input terminals are also at H level, the output terminals of the NAND gates 112 and 128 remain at the H level. Thus, the output terminals of the NAND gates 110 and 124 remain at L level. Since both of the input terminals of the EX-OR gate 116 are at L level, its output terminal is at L level. As a result, the relay 142 is not energized, and power is not supplied to the magnetron 46.

When the cooking button is depressed, the motor 24 is energized and the table 18 rotates. The starafan (not shown) disposed in the vicinity of the opening 32 is also energized. When the switch 126 is closed in cooperation with the cooking button, the first input terminal of the NAND gate 124 is at L level, so that the output terminal of the NAND gate 124 is at H level. Since the output terminal of the NAND gate 110 remains at L level, the output terminal of the EX-OR gate 116 is at H level. Consequently, the transistor 134 is rendered conductive and the light-emitting diode 136 starts emitting light. Upon reception of this light, the phototransistor 140 is rendered conductive, and the relay 142 is energized so that power is supplied to the magnetron 46. The magnetron 46 outputs microwaves which are transmitted through the waveguide 48 and enter the heating chamber 14 through the opening 32. By the rotation of the starafan and the table, the microwaves irradiate the food 16 uniformly, and the food is heated.

As the food 16 is heated, the heat-sensitive probe 28 is heated and the liquid 59 inside the skewer 58 expands. Then, the bellows 60 is expanded and the pin 64 presses up the lower surface of the spring plate 54. When this pressing force of the pin 64 due to thermal expansion overcomes the biasing force of the plate spring 54, the plate spring 54 is bent upwardly as shown in FIG. 3B, generating a sound.

Figure 5:
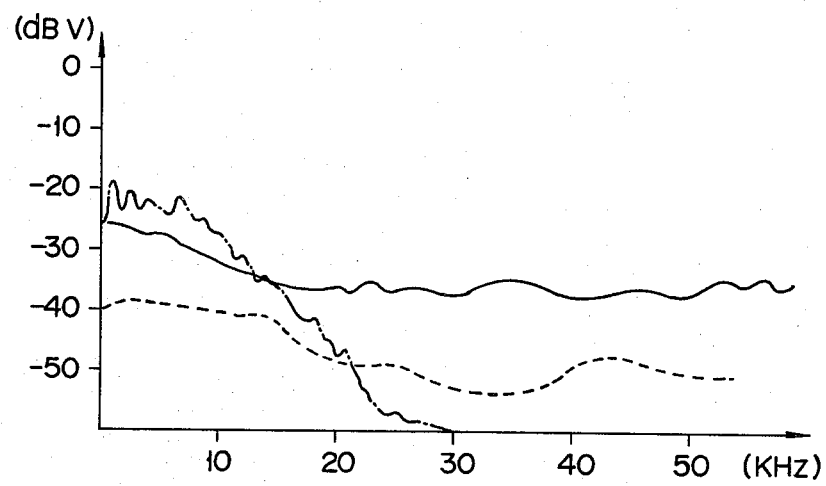
FIG. 5 is a graph showing characteristics for explaining the operation of the first embodiment.

The microphone 36 detects this sound and outputs a signal which is supplied to the band-pass filter 102 through the amplifying circuit 80. The frequency characteristics of the sound generated by the plate spring 54 is shown by the solid line in FIG. 5. During the heating, white noise is generated by the magnetron 46 and the surrounding circuits, and white noise is also generated by the food itself; the frequency characteristics thereof are shown in FIG. 5 by the broken line and the alternate long and short dash line, respectively. The frequency band of the band-pass filter 102 is set to 17 to 23 kHz so that the sound from the heat-sensitive probe 28 alone is allowed to pass, and no erroneous detection occurs. When the sound from the heat-sensitive probe 28 is detected, the transistor 108 is rendered conductive. When the first input terminal of the NAND gate 110 is at L level, its output terminal is at H level. Since the output terminal of the NAND gate 124 remains at H level, the output terminal of the EX-OR gate 116 is at L level and the transistor 134 is rendered nonconductive. As a result, the relay 142 is de-energized, and the supply of power to the magnetron 46 is interrupted. Then, the magnetron 46 stops oscillating which automatically interrupts the heating of the food 16. The timing for generating the sound by the heat-sensitive probe 28 is determined by the position of the threading engagement of the bowl-shaped container 50 with the lid body 52, and this adjusts the heating time. Even when the heat-sensitive probe 28 stops generating the sound, the transistor 108 returns to the nonconductive state and the first input terminal of the NAND gate 110 returns to H level, the second input terminal is kept at L level so that the output terminal of the NAND gate 110 is kept at H level. Therefore, the output terminal of the EX-OR gate 116 is also kept at L level, and this condition is maintained thereafter.

According to this embodiment, a microwave oven can be provided which is capable of automatically interrupting heating by the output sound of a heat-sensitive probe with a very simple construction.

In this embodiment, a blowing hole, an exhaust hole and a fan may be disposed in the heating chamber 14 so that the fan may form an air flow from the blowing hole to the exhaust hole. With this construction, water vapor generated by the food 16 may be immediately exhausted from the heating chamber 14 to the outside so that heating efficiency may be improved.

Figure 6A:
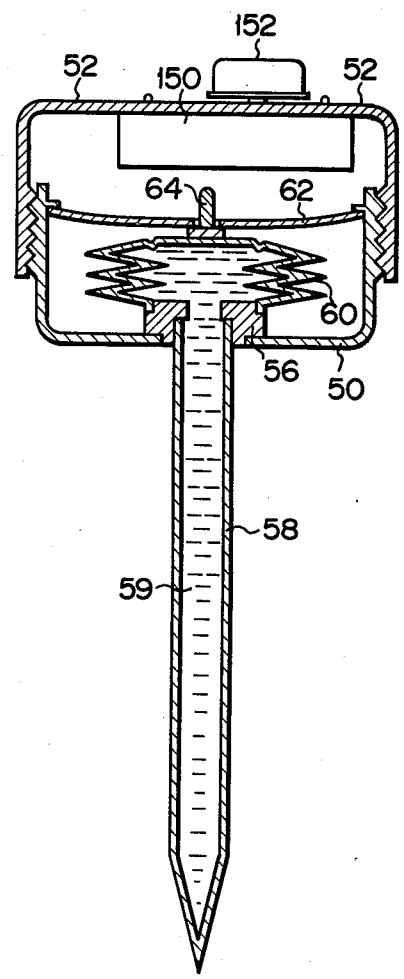
FIGS. 6A and 6B are sectional views of the heat-sensitive probe used in a second embodiment of the present invention.
Figure 6B:
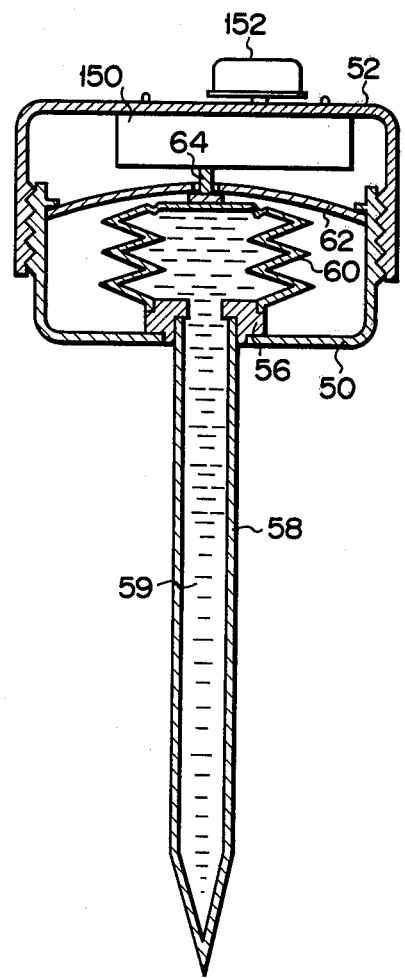

A second embodiment of the microwave oven according to the present invention will now be described. Since this embodiment is similar to the first embodiment except for the heat-sensitive probe 28 and the magnetron control circuit 44, the same parts are designated by the same reference numerals in the drawings, and their description will be omitted. FIGS. 6A and 6B show the heat-sensitive probe 28 at room temperature and under the heating condition in correspondence to FIGS. 3A and 3B. This embodiment differs from the first embodiment in that, although the spring 54 is fitted in the upper surface of the lid body 52 in the first embodiment, a sound generating mechanism 150 is disposed inside the upper surface of the lid body 52 in the second embodiment and, during heating, the pin 64 protruding at the upper part of the bellows 60 is inserted in this sound generating mechanism 150. A plate spring 62 which is bent downwardly at the room temperature is fitted in the upper surface of the bowl-shaped container 50. The plate spring 62 and pin 64 are connected each other. A dial 152 is disposed outside the upper surface of the lid body 52, and the dial 152 is connected to the sound generating mechanism 150 through a shaft.

Figures 7A, 7B:
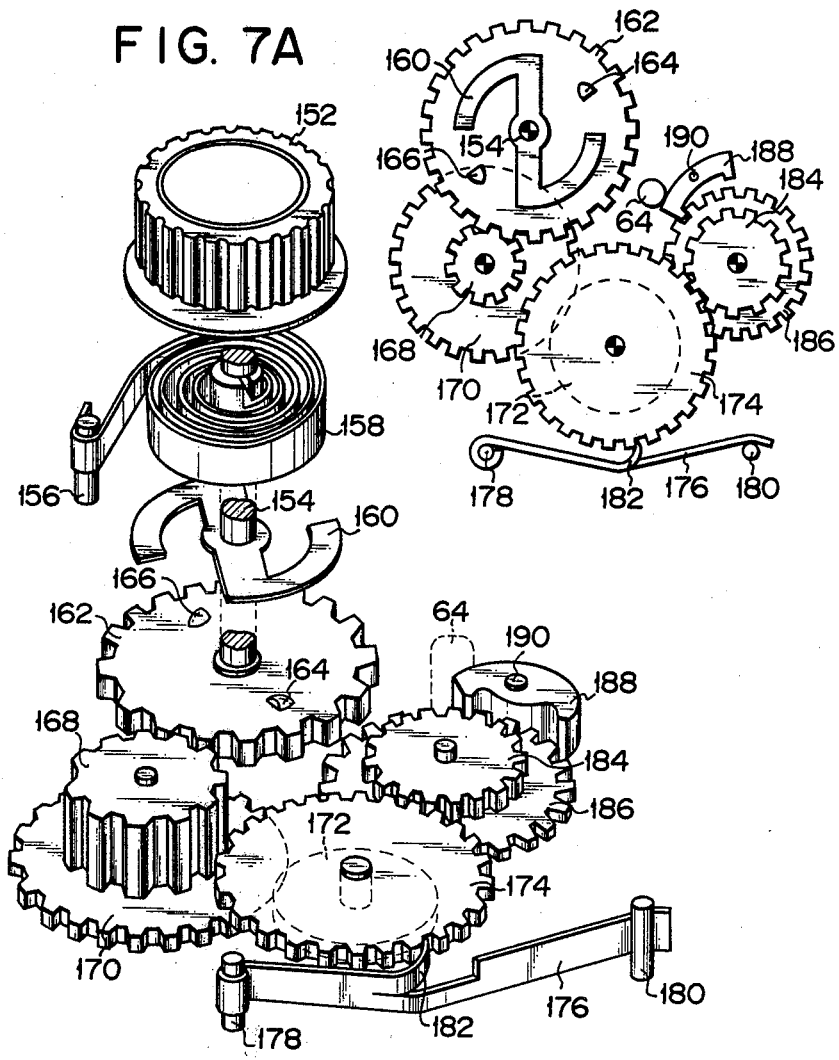
FIGS. 7A and 7B are a perspective view and a plan view, respectively, of the sound generating mechanism in the heat-sensitive probe of FIGS. 6A and 6B.

FIG. 7A is a perspective view showing the construction of the sound generating mechanism 150, and FIG. 7B is a plan view showing the same. The shaft 154 of the dial 152 extends inside the sound generating mechanism 150 through the lid body 52. The central end of a winding spring 158 whose outer end is locked by a pin 156 is secured to the shaft 154. The winding spring 158 winds from the outer end to the central end in the clockwise direction. A ratchet spring 160 is axially secured to the shaft 154 below the winding spring 158. The ratchet spring 160 has two arms which are bent downwardly. These arms define arc shapes in the counterclockwise direction. A gear 162 is pivoted to the shaft 154 below the ratchet spring 160. Two projections 164 and 166 are formed at the upper surface of the gear 162. The two arms of the ratchet spring 160 pass over these projections when the ratchet spring 160 rotates in the clockwise direction, and engage with these projections when the spring 160 rotates in the counterclockwise direction. The gear 162 engages with a gear 168. The gear 168 is attached to a coaxial gear 170 which has a greater number of teeth so that they provide a reduction gear. The gear 170 engages with a gear 172. The gear 172 is also attached to a coaxial gear 174 having a greater number of teeth so that they provide a reduction gear. A sound generating member 176 of spring steel is supported at both its ends by pins 178 and 180. The sound generating member 176 has a hook 182 which is brought into engagement with a tooth of the gear 174. The gear 174 engages with a gear 184. The gear 184 is attached to a coaxial gear 186 having a greater number of teeth so that they provide a reduction gear. The teeth of the gear 186 are located at such positions that they are engageable with a latch pawl 188 which is free to swing about a shaft 190. The pin 64 on the bellows 60 contacts the outside of the latch pawl 188 to prohibit the swinging movement of the latch pawl 188 when the bellows 60 is expanded as shown in FIG. 6B.

Figure 8:
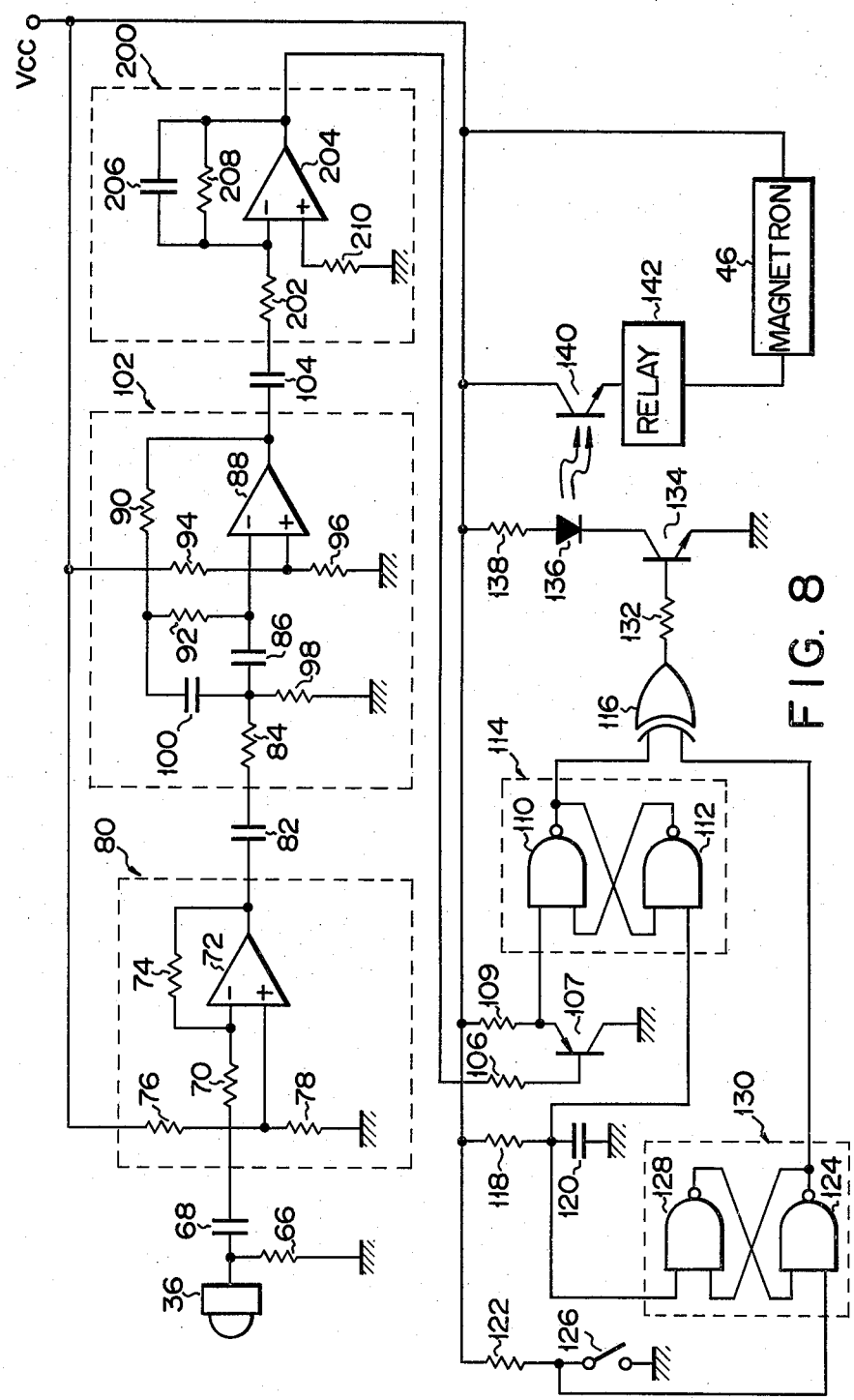
FIG. 8 is a circuit diagram of the control circuit of the second embodiment.

FIG. 8 is a circuit diagram of the control circuit of the magnetron control circuit. The circuit shown in this figure differs from that shown in FIG. 4 in that an integrating circuit 200 is interposed between the output terminal of the band-pass filter 102 and the resistor 106, and the resistor 106 is connected to the base of a pnp transistor 107. The output terminal of the band-pass filter 102 is connected to one end of an input resistor 202 through the coupling capacitor 104. The other end of the input resistor 202 is connected to the inverting input terminal of an operational amplifier 204. The output terminal of the operational amplifier 204 is connected to the inverting input terminal through a capacitor 206 and a resistor 208 connected in parallel. The non-inverting input terminal of the operational amplifier 204 is grounded through a resistor 210. The output terminal of the operational amplifier 204 is connected to the base of the transistor 107 through the resistor 106. The collector of the transistor 107 is grounded, and its emitter is connected to the power source terminal Vcc through the resistor 109.

Figure 9A:
FIGS. 9A and 9B are timing charts for showing the operation of the second embodiment.

The mode of operation of the second embodiment will now be described. In this embodiment, after supplying the main power source of the apparatus, the dial 152 of the heat-sensitive probe 28 is turned well in the clockwise direction to wind up the winding spring 158. Since the ratchet spring 160 passes over the projections 164 and 166, the gear 162 does not rotate and the reduction gear to follow does not rotate. After turning the dial 152, the heat-sensitive probe 28 is inserted in the food 16, and the food 16 is placed in the heating chamber 14. The winding spring 158 of the heat-sensitive probe 28, by its recovering force, rotates the shaft 154 in the counterclockwise direction. Consequently, the front ends of the two arms of the ratchet spring 160 contact the projections 164 and 166 of the gear 162 so that the gear 162 is rotated in accordance with the ratchet spring 160. This rotation is transmitted to the gear 186. When the gear 174 rotates, the teeth of the gear 174 catch the hook 182 of the sound generating member 176. The gear 186 is rotated in steps by the ratchet pawl 188. Due to this, the sound generating member 176 generates pulse sounds as shown in FIG. 9A. These sounds are supplied to the integrating circuit 200 through the microphone 36, the amplifying circuit 80 and the band-pass filter 102. The output terminal of the integrating circuit 204, i.e., the output terminal of the operational amplifier 204 produces a constant output signal and the transistor 107 is nonconductive as long as the pulse sounds are supplied. When power is supplied, the output terminals of the NAND gates 112 and 128 are at H level, and the output terminals of the NAND gates 110 and 124 are at L level. This condition does not change even when the capacitor 120 is charged. This condition is already established when the heat-sensitive probe 28 is inserted in the food 16 and the food 16 is placed in the heating chamber 14.

Figure 9B:

Since both of the input terminals of the EX-OR gate 116 are at L level, the output terminal of the EX-OR gate 116 is at L level and the transistor 134 is nonconductive. When the switch 126 is closed, the output terminal of the NAND gate 124 is at H level, and the output terminal of the EX-OR gate 116 is at H level as shown in FIG. 9B, and the transistor 134 is rendered conductive. As a result, the relay 142 is energized, and the power is supplied to the magnetron 46 to initiate heating.

When the food 16 is sufficiently heated and the liquid 59 inside the skewer 58 of the heat-sensitive probe 28 is expanded, the bellows 60 is stretched as shown in FIG. 6B. Then, the pin 64 prohibits the swinging movement of the latch pawl 188 to interrupt the rotation of the gear. Thus, the sound generating member 176 stops generating sounds as shown in FIG. 9A. The level of the output signal of the integrating circuit 200 is reduced, and the transistor 107 is rendered conductive. As a result, the output terminal of the NAND gate 110 is at H level, and the output terminal of the EX-OR gate 116 is at L level as shown in FIG. 9B, and the heating operation of the magnetron 46 is interrupted.

Since heating by the magnetron is carried out in response to the sound generating operation of the sound generating mechanism 150 and the closure of the switch 126, erroneous operation which might otherwise occur when one forgets to insert the heat-sensitive probe 28 in the food may be prevented in this embodiment. In order to achieve this, a light-emitting element is connected to the output terminal of the integrating circuit 200, and this light-emitting element may be operated as a warning when the output level of the integrating circuit 200 is less than a certain value.

A third embodiment of the microwave oven according to the present invention will now be described. This embodiment is similar to the second embodiment, except for the construction of the sound generating mechanism 150 inside the heat-sensitive probe 28 and the magnetron control circuit 44. The description of the similar parts will thus be omitted. FIG. 10A is a perspective view of the sound generating mechanism 150, and FIG. 10B is a sectional view of its main part. One blade 250 axially protrudes from the lower end of the shaft 154, for example, at the lower part of the gear 162. An axially movable cam 252 is mounted on the shaft 154 by this blade 250. A plate body 254 (shown in FIG. 10B) is axially secured to the upper part of the blade 250 of the shaft 154. A coil spring 256 is interposed between the plate body 254 and the cam 252. The coil spring 256 is biased to press down the cam 252. The front end of the cam 252 contacts an upright piece 262 of a hammer 260 which is rotatably held by a pin 258. The end of the hammer 260 which is closer to the upright piece 262 is pulled by a coil spring 264. The biasing force of this spring is prohibited by the engagement of the cam 252. The front end of a plate spring 266 which is biased downwardly is branched into two contacts at the lower surface of the cam 252. This front end clamps the shaft 154. The plate spring 266 has an arm 268 which protrudes perpendicularly. The front end of the arm 268 has a pawl at its lower side, and this pawl is capable of prohibiting the biasing force of the hammer 260. The pin 64 protruding at the upper part of the bellows 60 contacts the lower surface of the plate spring 266. A metal ball 270 is mounted to the other end of the hammer 260, and the metal casing (not shown) is disposed in the vicinity of the ball 270.

Figure 11:
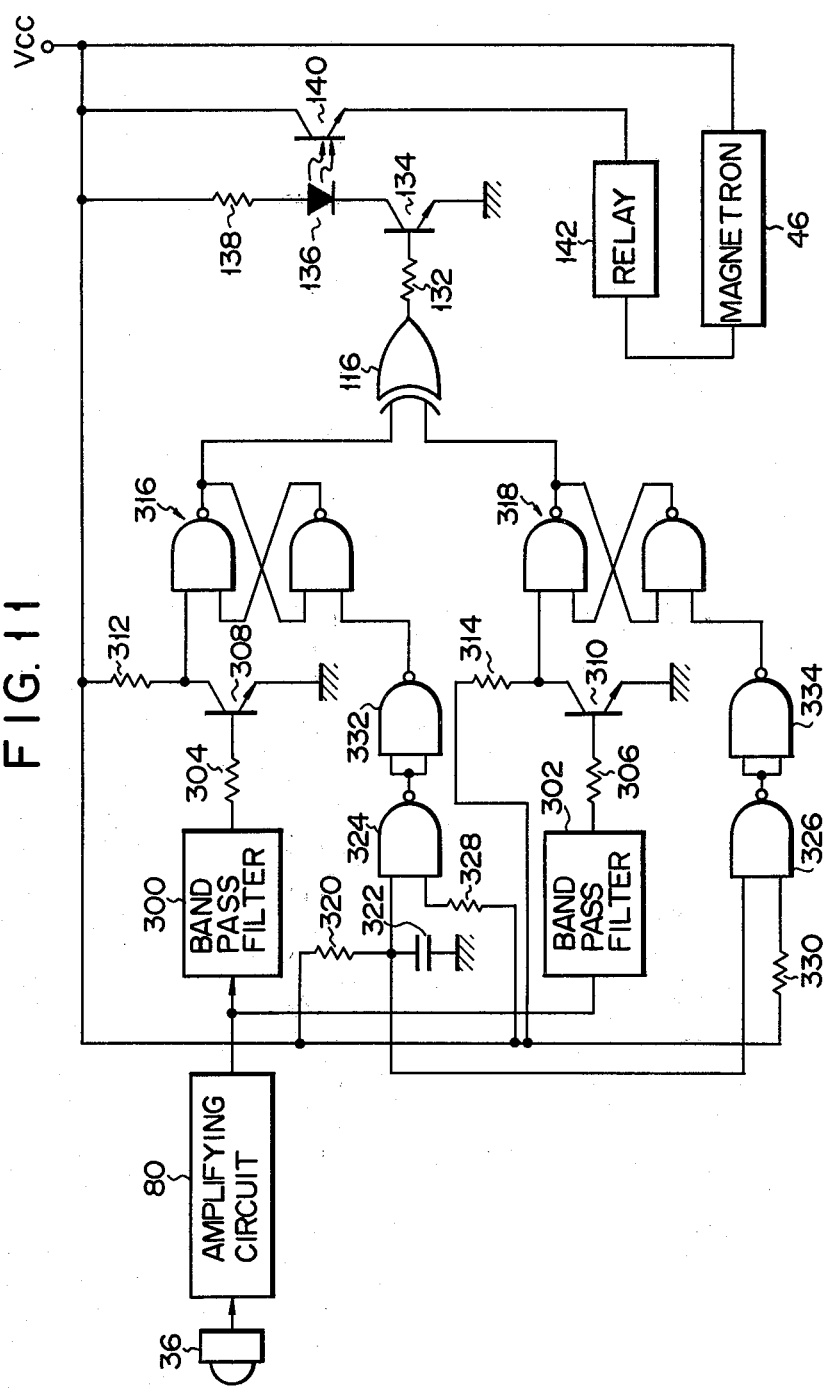
FIG. 11 is a circuit diagram of the control circuit of the third embodiment.

FIG. 11 is a circuit diagram of the magnetron control circuit. In this embodiment, the output signal of the microphone 36 is connected to first and second band-pass filters 300 and 302 through the amplifying circuit 80. The output terminals of the first and second band-pass filters 300 and 302 are connected to the bases of npn transistors 308 and 310, through resistors 304 and 306, respectively. The collectors of the transistors 308 and 310 are connected to the power source terminal Vcc through resistors 312 and 314, respectively, and the emitters are grounded. The collectors of the transistors 308 and 310 are also connected to the set terminal S of R S flip-flops 316 and 318, respectively. A junction between a resistor 310 and a capacitor 322 of a power source pull-up circuit is connected to one input terminal each of NAND gates 324 and 326. The power source terminal Vcc is connected to the other input terminals of the NAND gates 324 and 326 through resistors 328 and 330, respectively. The output terminals of the NAND gates 324 and 326 are connected to the reset terminals R of the R S flip-flops 316 and 318 through inverters 332 and 334, respectively. The output terminals Q of the flip-flops 316 and 318 are connected to respective input terminals of the EX-OR gate 116. The output terminal of the EX-OR gate 116 is connected to the base of the npn transistor 134 through the resistor 132 as in the cases of the first and second embodiments, and the rest of the network is the same as in the cases of the first and second embodiments.

The mode of operation of this embodiment will now be described. After the main power supply is turned on, the output terminals of the flip-flops 316 and 318 are at L level, the output terminal of the EX-OR gate 116 is at L level, and the magnetron 46 is not supplied with power. The dial 152 of the heat-sensitive probe 28 is sufficiently turned in the clockwise direction to wind the winding spring 158. At this instant, the gear 162 does not rotate, and the sound generating member 182 does not generate sounds. As the shaft 154 rotates, the cam 252 presses the hammer 260 against the biasing force of the spring 264. Thus, the hammer 260 is hooked by the arm 268 of a plate spring 266, and the hammer 260 separates the ball 270 at its front end from the casing.

Figure 12A:
FIGS. 12A, 12B and 12C are timing charts for showing the operation of the third embodiment.
Figure 12B:
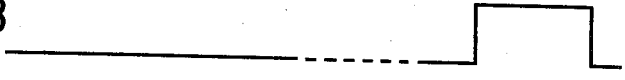
Figure 12C:

When the heat-sensitive probe 28 is inserted in the food 16 and this is placed inside the heating chamber 14, the gear 162 is rotated by the recovering force of the winding spring 158 and the reduction gears are sequentially rotated. The sound generating member 182 is caught by the gear 174 and pulse sounds as shown in FIG. 12A are generated. The first band-pass filter 300 passes this pulse sounds. Then, the transistor 308 is rendered conductive, the output terminal of the flip-flop 316 is at H level, and the output terminal of the EX-OR gate 116 is at H level as shown in FIG. 12C, so that power is supplied to the magnetron 46. When the temperature of the food 16 increases and the bellows 60 expands, the pin 64 is moved upward to press up the plate spring 266 to interrupt the locking of the hammer 260. Then, the hammer 260 rotates about the pin 258 by the biasing force of the spring 264, and the ball 270 strikes the casing (not shown). Then a sound as shown in FIG. 12B is generated. The second band-pass filter 302 passes this sound. Then, the transistor 310 is rendered conductive, the output terminal of the flip-flop 318 is at H level, and the output terminal of the EX-OR gate 116 is at L level, so that heating of the magnetron 46 may be interrupted.

Figure 13:
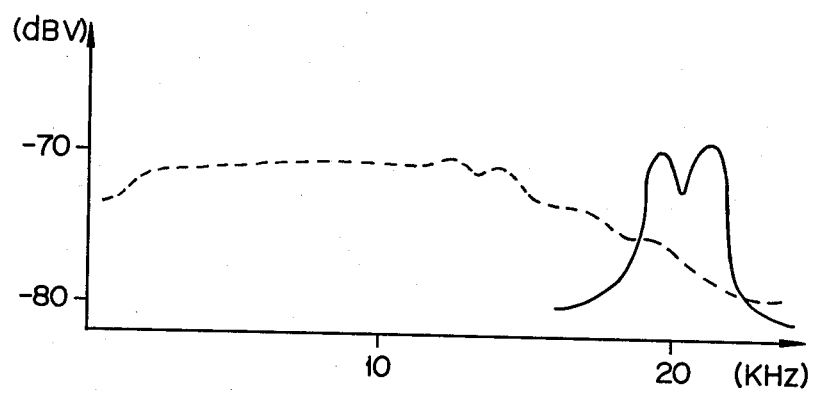
FIG. 13 is a graph showing characteristics for explaining the operation of the third embodiment.

The frequency of the sound shown in FIG. 12A, i.e., the bandwidth of the first band-pass filter 300, is 23 kHz and the frequency of the sound shown in FIG. 12B, i.e., the bandwidth of the second band-pass filter 302 is 17 kHz. Thus, since the frequency characteristics of the conventional microphone 36 are flat over a wide range as shown by the broken line in FIG. 13, a microphone for ultrasonic waves of narrow bandwidth having peaks near 17 kHz and 23 kHz as shown by the solid line in FIG. 13 may be conveniently used.

What we claim is:

1. A self-controlled microwave oven comprising:
an oven cavity;
high frequency oscillating means for producing microwaves for heating of food inside said cavity to be cooked;
a hollow skewer having a closed end inserted in the food and an open end protruding from the food and which is formed of a thermal conductive material;
an expandable hollow bellows secured to the open end of said skewer which has a hollow inside for communicating with the hollow inside of said skewer;
a liquid sealed inside said bellows and skewer which is heated through said skewer and has said bellows expanded when the food is heated;
sound generating means operably connected to said skewer and proximate to said bellows, for generating a sound whenever said bellows expand to a prescribed distance, wherein said sound generating means includes a plate spring which is pressed by said bellows when the bellows is expanded and which generates a sound when the pressing force of said bellows overcomes the biasing force of the plate spring; and
control means communicating with said cavity and connected to said high frequency oscillating means which supplies an energy control signal to said high frequency oscillating means in response to a sound generated by said sound generating means and which thereby controls heating of the food in said cavity, wherein said control means includes a microphone for detecting a sound of said sound generating means to convert it into an electrical signal, a signal generator having an operating member for generating a signal by operation of the operating member, a first flip-flop which is reset when power is supplied and set in response to an output signal of said signal generator, a second flip-flop which is reset when power is supplied and set in response to an output signal of said microphone, an EXCLUSIVE-OR gate which is connected to the output terminals of said first and second flip-flops and a switching element connected to the output terminal of said EXCLUSIVE-OR gate for controlling the supply of power to said high frequency oscillating means and wherein said control means generates an energizing interruption signal in response to a sound of said sound generating means.

2. A self-controlled microwave oven comprising:
an oven cavity;
high frequency oscillation means for producing microwaves for heating of food inside said cavity to be cooked;
a hollow skewer having a closed end inserted into the food and an open end protruding from the food and which is formed from a thermal conductive material;
an expandable hollow bellows secured to the open end of said skewer which has a hollow inside for communicating with the hollow inside of said skewer;
a liquid sealed inside said bellows and skewer which is heated through said skewer and has said bellows expanded when the food is heated;
sound generating means for generating a sound until said bellows expands to a prescribed distance wherein said sound generating means includes a winding spring, a gear mechanism which is rotated in steps by the recovery force of the winding spring and which is prohibited from rotating by expansion of said bellows and a plate spring disposed in the vicinity of said gear mechanism and wherein said sound generating means generates a pulse sound by catching the teeth of said gear mechanism during rotation thereof; and
control means communicating with said cavity and connected to said high frequency oscillating means which supplies an energizing control signal to said high frequency oscillation means in response to a sound generated by said sound generating means and which thereby controls heating of the food, wherein said control means includes a microphone for detecting a pulse sound generated by said sound generating means for conversion into a pulse signal, a signal generator having an operating member for generating a signal upon operation of the operating member, an integrator connected to the output terminal of said microphone and generating an output signal in response to the pulse signal, a first flip-flop which is reset when power is supplied and which is set in response to the output signal from said signal generator, a second flip-flop which is reset in accordance with a power supply and the output signal from said integrator and which second flip-flop is set in response to an interruption of the output signal of said integrator, an EXCLUSIVE-OR gate connected to the output terminals of said first and second flip-flops and a switching element connected to the output terminal of said EXCLUSIVE-OR gate and for controlling supply of power to said high frequency oscillating means.

3. A self-controlled microwave oven comprising:

an oven cavity;

high frequency oscillating means for producing microwaves for heating of food inside said cavity to be cooked;

a hollow skewer having a closed end inserted into the food and an open end protruding from the food and which is formed from a thermal conductive material;

an expandable hollow bellows secured to the open end of said skewer which has a hollow inside for communicating with the hollow inside of said skewer;

a liquid sealed inside said bellows and skewer which is heated through said skewer and has said bellows expanded when the food is heated;

sound generating means for generating a sound until said bellows expands to a prescribed distance wherein said sound generating means includes a winding spring, a gear mechanism which is rotated in steps by the recovering force of the winding spring and which is prohibited from rotating by expansion of said bellows, a plate spring which is disposed in the vicinity of said gear mechanism and which generates a first pulse sound by catching the teeth of gear mechanism during rotation thereof and sound generating member which generates a second pulse sound in response to expansion of said bellows; and control means communicating with said cavity and connected to said high frequency oscillating means which supplies an energizing control signal to said high frequency oscillating means in response to a sound generated by said sound generating means and which thereby controls heating of the food, wherein said control means includes a microphone for detecting first and second pulse sounds respectively generated by said plate spring and sound generating member for producing first and second pulse signals, first and second band-pass filters connected to the output terminal of said microphone and passing only said first and second pulse signal respectively, a first flip-flop which is reset when power is supplied and which is set in response to an output signal from said first band-pass filter, a second flip-flop which is reset when power is supplied and which is set in response to an output signal from said second band-pass filter, an EXCLUSIVE-OR gate connected to the output terminals of said first and second flip-flops and a switching element connected to the output terminal of said EXCLUSIVE-OR gate for controlling supply of power to said high frequency oscillating means.

* * * * *